US008355215B2

(12) United States Patent
Asami

(10) Patent No.: US 8,355,215 B2
(45) Date of Patent: Jan. 15, 2013

(54) IMAGE PICKUP LENS AND IMAGE PICKUP APPARATUS

(75) Inventor: Taro Asami, Saitama (JP)

(73) Assignee: Fujifilm Corporation, Tokyo (JP)

( * ) Notice: Subject to any disclaimer, the term of this patent is extended or adjusted under 35 U.S.C. 154(b) by 147 days.

(21) Appl. No.: 13/083,824

(22) Filed: Apr. 11, 2011

(65) Prior Publication Data

US 2011/0249349 A1 Oct. 13, 2011

(30) Foreign Application Priority Data

Apr. 12, 2010 (JP) ................................ 2010-091043
Jun. 2, 2010 (JP) ................................ 2010-126957

(51) Int. Cl.
*G02B 9/62* (2006.01)

(52) U.S. Cl. ........................................ 359/761; 359/756

(58) Field of Classification Search .................. 348/335, 348/340; 359/756, 761
See application file for complete search history.

(56) References Cited

U.S. PATENT DOCUMENTS 5,682,269 A 10/1997 Kimura et al.
7,830,620 B2 * 11/2010 Asami .......................... 359/761
8,054,562 B2 * 11/2011 Asami .......................... 359/761

FOREIGN PATENT DOCUMENTS

JP 11142730 5/1999
JP 2005-024969 1/2005
JP 3723637 12/2005
JP 3723654 12/2005

* cited by examiner

*Primary Examiner* — David N Spector
(74) *Attorney, Agent, or Firm* — Young & Thompson

(57) ABSTRACT

Disclosed is an image pickup lens having the following disposed from an object side in the order listed below: a first lens having a negative power and a meniscus shape with a concave surface on an image side; a second lens having a positive power; a third lens having a negative power; a fourth lens having a positive power; a fifth lens having a positive power; and a sixth lens having a negative power and a meniscus shape with a concave surface on the object side. The image pickup lens satisfies Conditional Expression (1) given below when a focal length of the first lens is taken as f1 and a focal length of the second lens is taken as f2

$$-3.0<f1/f2<-1.6 \quad (1).$$

13 Claims, 12 Drawing Sheets

EXAMPLE 8

FIG.1
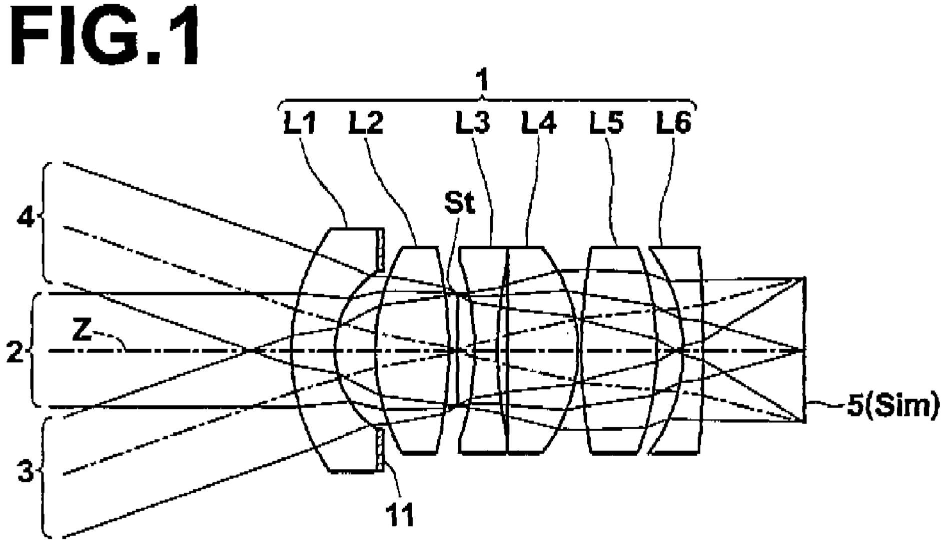
FIG.2 EXAMPLE 1
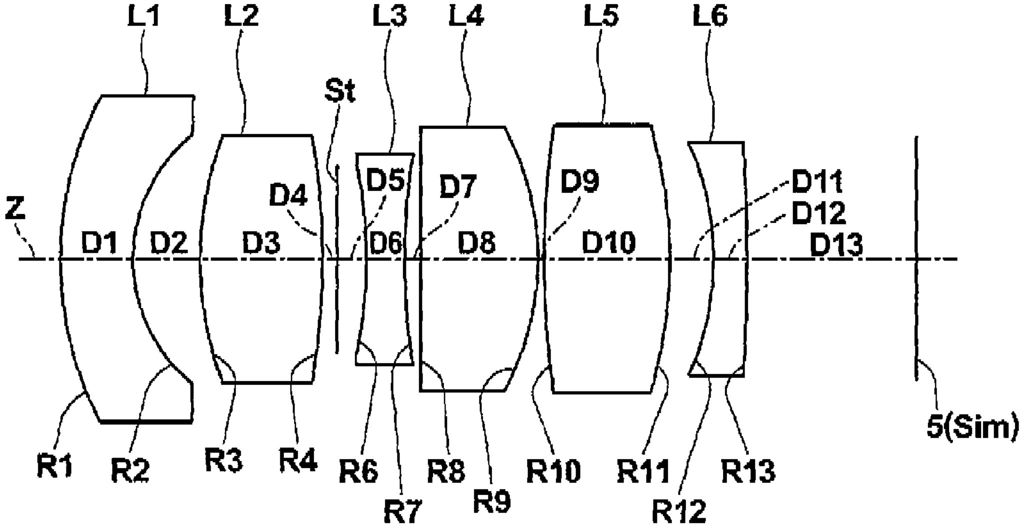

EXAMPLE 2

EXAMPLE 3

EXAMPLE 4

EXAMPLE 5

EXAMPLE 6

EXAMPLE 7

EXAMPLE 8

EXAMPLE 9

EXAMPLE 10

EXAMPLE 1

EXAMPLE 2

EXAMPLE 5

EXAMPLE 6

IMAGE PICKUP LENS AND IMAGE PICKUP APPARATUS

BACKGROUND OF THE INVENTION

1. Field of the Invention

The present invention relates to an image pickup lens and an image pickup apparatus, and more particularly to an image pickup lens appropriate for use with a vehicle camera, a surveillance camera, or the like having an image sensor, such as a CCD (charge coupled device) or a CMOS (complementary metal oxide semiconductor), and an image pickup apparatus having the image pickup lens.

2. Description of the Related Art

Image pickup devices, such as a vehicle camera for taking images around a vehicle, a cell phone camera, a surveillance camera installed for obtaining surveillance images or security purposes, and the like, are known. Generally, these devices include an image pickup lens and an image sensor, such as a CCD or a CMOS, for converting an image formed by the image pickup lens into an electrical signal. Downsizing and increasing of pixel count for these image sensors have been advancing year after year and, along with this, downsizing of image pickup devices has also been advancing. Consequently, a demand for downsizing and performance improvement of image pickup lenses to be mounted in the image pickup devices has also been growing.

In the mean time, for vehicle cameras and surveillance cameras, inexpensive lenses having high weather resistance and usable in a wide temperature range from an open air temperature in a cold weather region to an in-vehicle temperature in summer of a tropical region with a small F-number that allows night time use and high performance have been sought.

As for the image pickup lenses used in the aforementioned application fields, image pickup lenses described in Japanese Patent No. 3723654 (Patent Document 1), Japanese Unexamined Patent Publication No. 2005-024969 (Patent Document 2), Japanese Patent No. 3723637 (Patent Document 3), U.S. Pat. No. 5,682,269 (Patent Document 4), and Japanese Unexamined Patent Publication No. 11 (1999)-142730 (Patent Document 5) are known. The present applicant has proposed a six element image pickup lens usable in the aforementioned application fields in Japanese Unexamined Patent Publication Nos. 2008-276246 and 2009-143092. Patent Document 1 describes a five element image pickup lens with negative, positive, negative, positive, and positive lens arrangement. Patent Document 2 describes a six element image pickup lens constituted by a front group that includes an aspherical lens and a rear group having a positive refractive power. Patent Document 3 describes a six element image pickup lens having a long back focus length. Patent Document 4 describes a six element image pickup lens having a cemented lens on the most image side. Patent Document 5 describes a six element image pickup lens that includes an aspherical lens.

The image pickup lens described in Patent Document 1 has only five elements and there is still room for improvement in aberration correction in comparison with those having six elements or more. The image pickup lens described in Patent Document 2 or 5 uses an aspherical lens. If a plastic is used as the material of the aspherical lens, performance change due to temperature change is likely to occur, thereby causing a problem when the image pickup lens is used over a wide temperature range. Consequently, it is desirable that a glass material is used for the aspherical lens. The use of a glass material for an aspherical lens, however, requires glass molding, resulting in an expensive aspherical lens.

The image pickup lens described in Patent Document 3 or 4 uses only glass spherical lenses, which is advantageous over an image pickup lens that uses a glass mold aspherical lens. The image pickup lens described in Patent Document 3, however, has a total length too long to be qualified as a sufficiently downsized image pickup lens. The image pickup lens described in Patent Document 4 is relatively downsized but has an F-number of 2.8 which is rather too large to be used for vehicle and surveillance applications which are expected to occasionally perform imaging under a low illumination environment.

In view of the circumstances described above, it is an object of the present invention to provide a small and inexpensive image pickup lens, yet having a small F-number and high optical performance, and an image pickup apparatus having the image pickup lens.

SUMMARY OF THE INVENTION

An image pickup lens of the present invention is an image pickup lens, including the following disposed from an object side in the order listed below:

a first lens having a negative power and a meniscus shape with a concave surface on an image side;

a second lens having a positive power;

a third lens having a negative power;

a fourth lens having a positive power;

a fifth lens having a positive power; and a sixth lens having a negative power and a meniscus shape with a concave surface on the object side, wherein the lens satisfies Conditional Expression (1) given below when a focal length of the first lens is taken as f1 and a focal length of the second lens is taken as f2.

$$-3.0<f1/f2<-1.6 \quad (1)$$

If each lens is an aspherical lens, expressions of "having a negative power and a meniscus shape with a concave surface on an image side" with respect to the first lens, "having a positive power" with respect to the second lens, "having a negative power" with respect to the third lens, "having a positive power" with respect to the fourth lens, "having a positive power" with respect to the fifth lens, and "having a negative power and a meniscus shape with a concave surface on the object side" with respect to the sixth lens are applicable to a paraxial region.

Preferably, the image pickup lens of the present invention satisfies Conditional Expressions (2) to (8) given below. A preferred embodiment of the present invention may be an embodiment that satisfies any one of Conditional Expressions (2) to (8) or a combination of two or more of them.

$$15.0<\nu d1-\nu d2<30.0 \quad (2)$$

$$1.0<f3456/f \quad (3)$$

$$0.5<f5/f<1.5 \quad (4)$$

$$-1.5<f6/f<-0.6 \quad (5)$$

$$-1.2<f3/f<-0.3 \quad (6)$$

$$-1.0<R9/f<-0.5 \quad (7)$$

$$0.5<f4/f5<1.5 \quad (8)$$

where, vd1: an Abbe number of the first lens with respect to d-line;

vd2: an Abbe number of the second lens with respect to d-line;

f3456: a combined focal length from the third lens to the sixth lens;

f: a focal length of the entire lens system;

f3: a focal length of the third lens;

f4, a focal length of the fourth lens;

f5, a focal length of the fifth lens;

f6, a focal length of the sixth lens; and

R9: a radius of curvature of an image side surface of the fourth lens.

In the present invention, a positive sign is used for a radius of curvature if the lens surface is convex on the object side and a negative sign is used for a radius of curvature if the surface is convex on the image side. If the fourth lens is an aspherical lens, a radius of paraxial curvature is used as R9.

In the image pickup lens of the present invention, it is preferable that an Abbe number of the fourth lens with respect to d-line is not less than 35. In the image pickup lens of the present invention, it is preferable that an Abbe number of the fifth lens with respect to d-line is not less than 35. In the image pickup lens of the present invention, it is preferable that an Abbe number of the sixth lens with respect to d-line is not greater than 30. In the image pickup lens of the present invention, it is preferable that an Abbe number of the first lens with respect to d-line is not less than 40.

In the image pickup lens of the present invention, an aperture may be disposed between the second and third lenses or between the third and fourth lenses.

An image pickup apparatus of the present invention is an apparatus that includes the image pickup lens described above.

The image pickup lens of the present invention is a lens system with a number of lenses being limited to a minimum of six in which the shape and power of each lens are set appropriately to satisfy Conditional Expression (1) above. This allows the image pickup lens to be structured compactly and inexpensively and to have a small F-number and high optical performance.

The image pickup apparatus of the present invention includes the image pickup lens of the present invention, so that the apparatus may be structured compactly and inexpensively. In addition, the apparatus is capable of obtaining a high resolution image and performing satisfactory imaging under low illumination conditions.

BRIEF DESCRIPTION OF THE DRAWINGS

FIG. 1 illustrates a configuration and an optical path of an image pickup lens according to an embodiment of the present invention.

FIG. 2 is a cross-sectional view of an image pickup lens of Example 1 of the present invention, illustrating a lens configuration thereof.

DESCRIPTION OF THE PREFERRED EMBODIMENTS

Figure 3:
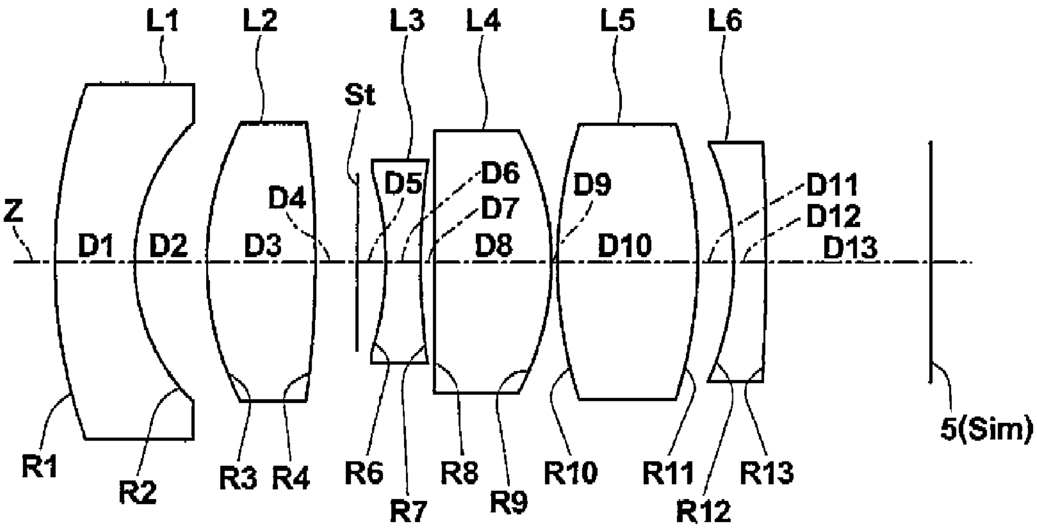
FIG. 3 is a cross-sectional view of an image pickup lens of Example 2 of the present invention, illustrating a lens configuration thereof.
Figure 4:
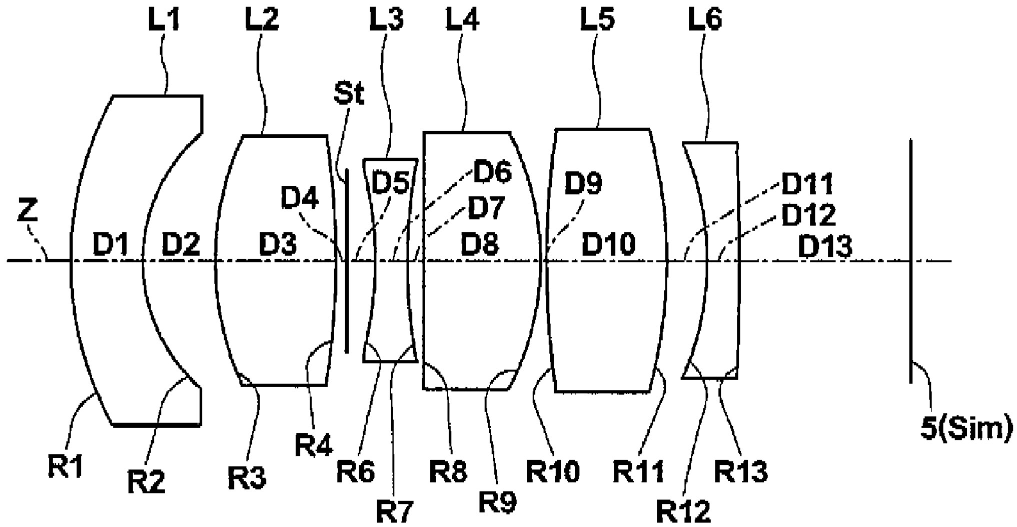
FIG. 4 is a cross-sectional view of an image pickup lens of Example 3 of the present invention, illustrating a lens configuration thereof.
Figure 5:
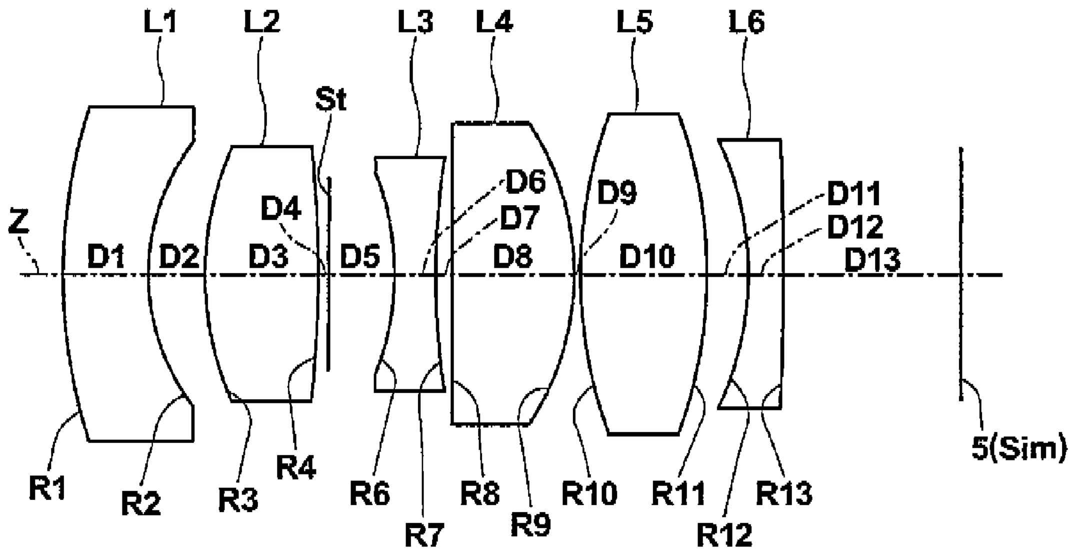
FIG. 5 is a cross-sectional view of an image pickup lens of Example 4 of the present invention, illustrating a lens configuration thereof.
Figure 6:
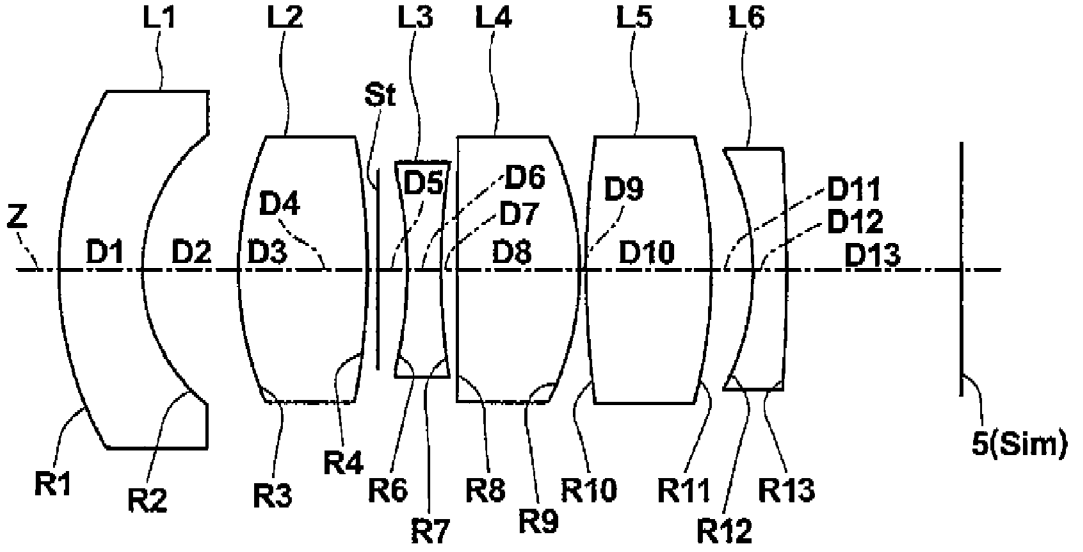
FIG. 6 is a cross-sectional view of an image pickup lens of Example 5 of the present invention, illustrating a lens configuration thereof.
Figure 7:
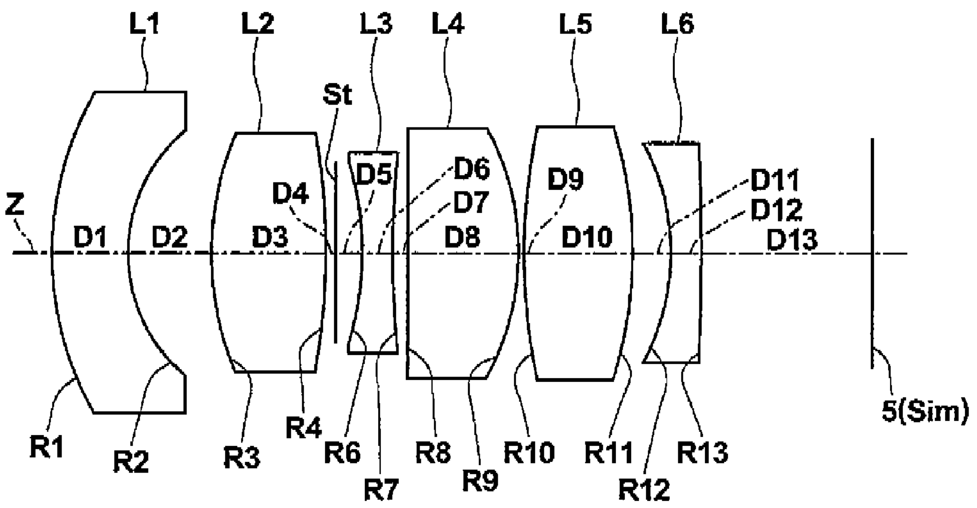
FIG. 7 is a cross-sectional view of an image pickup lens of Example 6 of the present invention, illustrating a lens configuration thereof.
Figure 8:
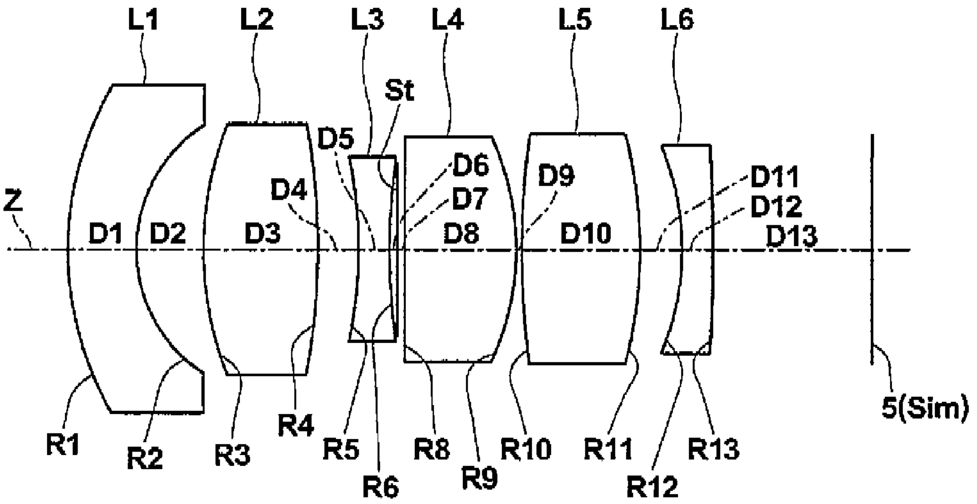
FIG. 8 is a cross-sectional view of an image pickup lens of Example 7 of the present invention, illustrating a lens configuration thereof.
Figure 9:
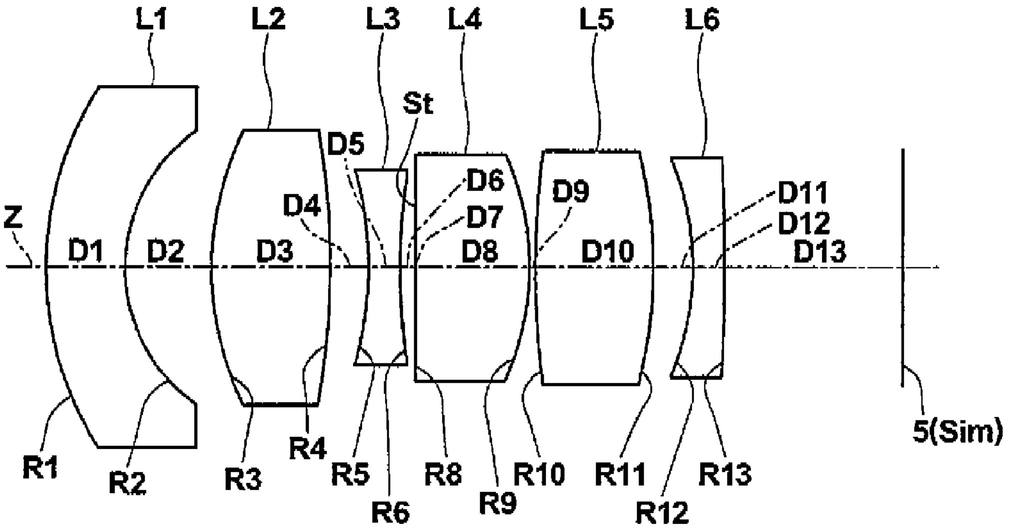
FIG. 9 is a cross-sectional view of an image pickup lens of Example 8 of the present invention, illustrating a lens configuration thereof.
Figure 10:
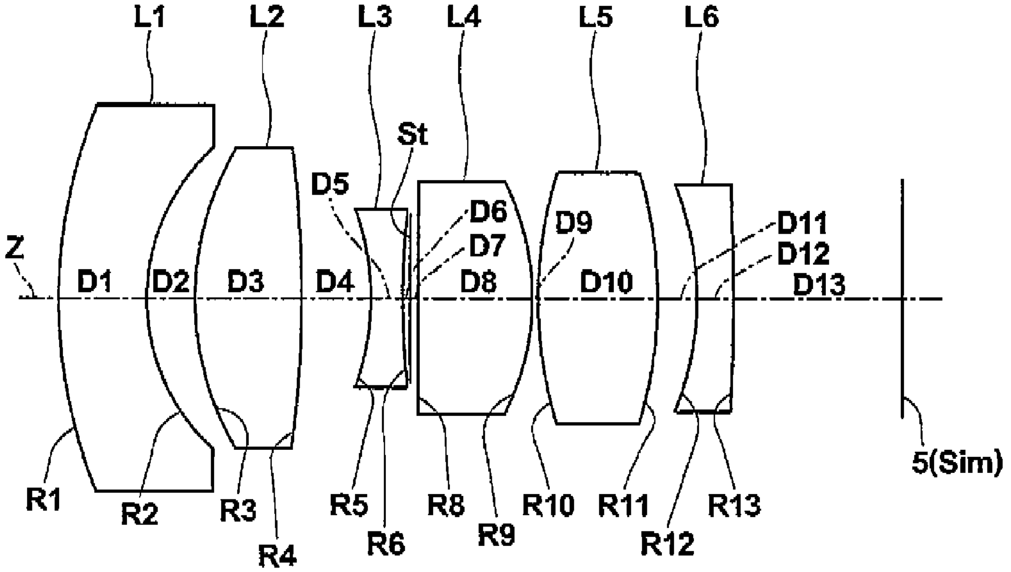
FIG. 10 is a cross-sectional view of an image pickup lens of Example 9 of the present invention, illustrating a lens configuration thereof.
Figure 11:
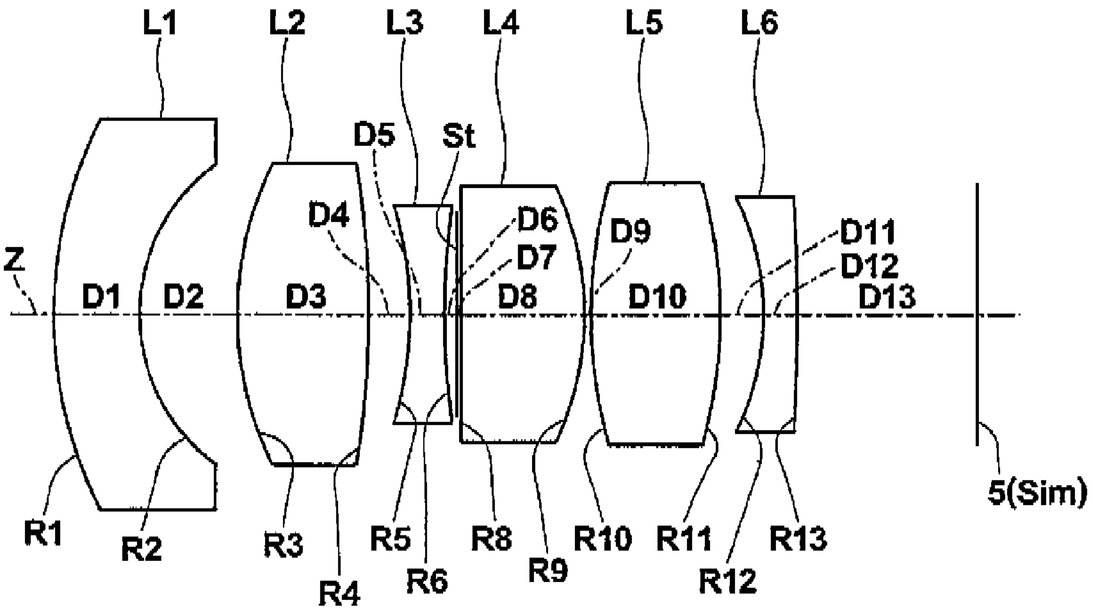
FIG. 11 is a cross-sectional view of an image pickup lens of Example 10 of the present invention, illustrating a lens configuration thereof.
Figures 12A, 12B, 12C, 12D:
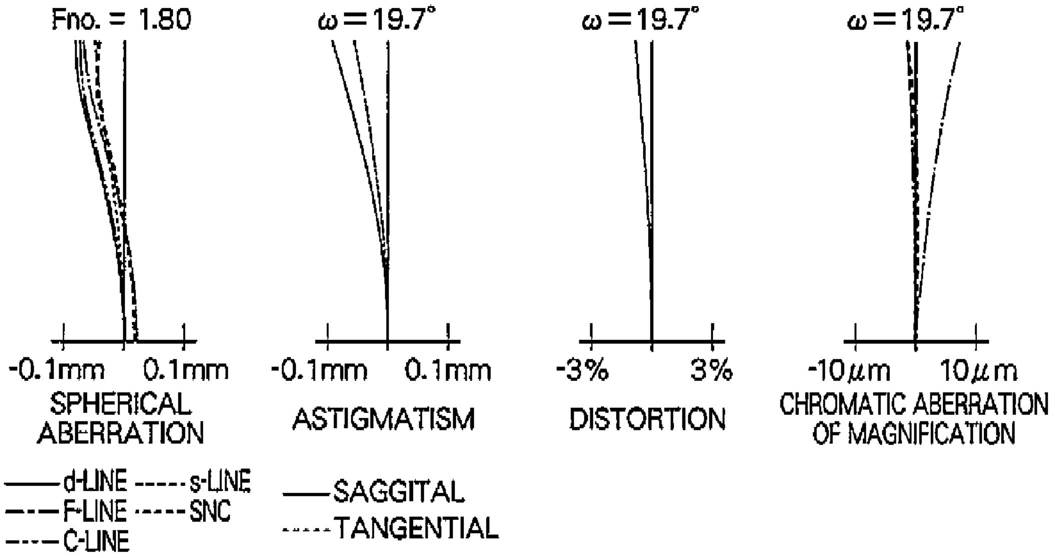
FIGS. 12A to 12D illustrate respective aberrations of the image pickup lens of Example 1 of the present invention.
Figures 13A, 13B, 13C, 13D:
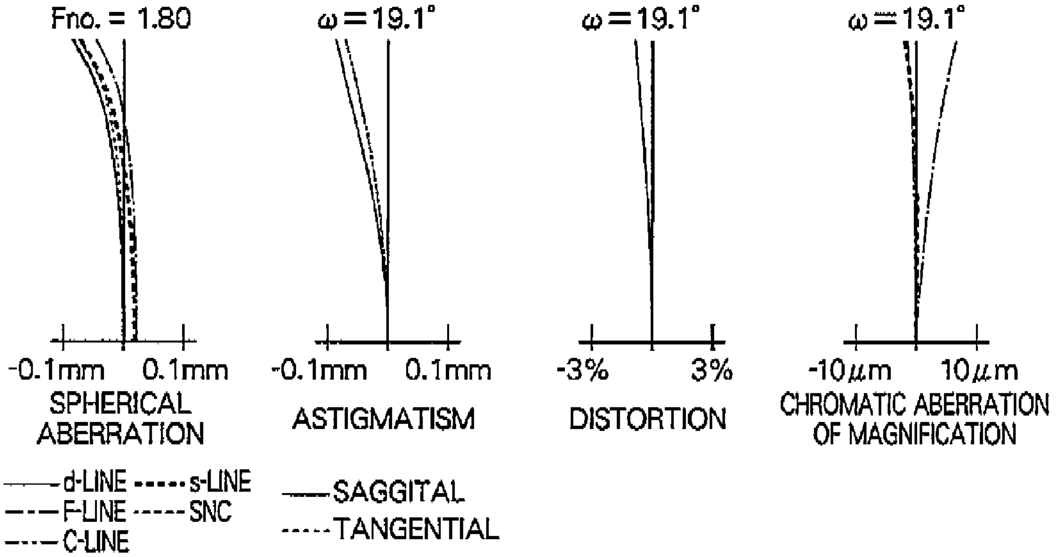
FIGS. 13A to 13D illustrate respective aberrations of the image pickup lens of Example 2 of the present invention.
Figures 14A, 14B, 14C, 14D:
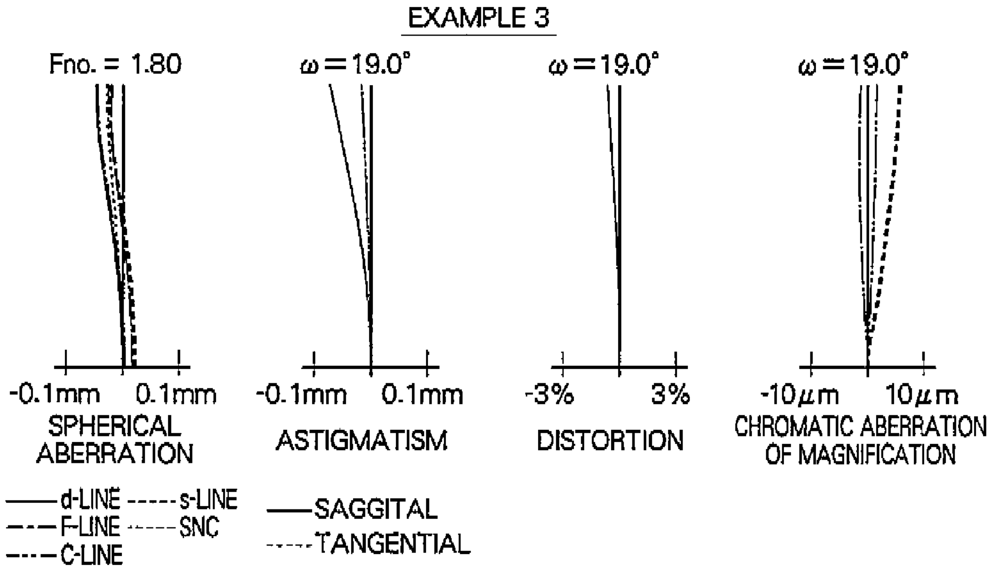
FIGS. 14A to 14D illustrate respective aberrations of the image pickup lens of Example 3 of the present invention.
Figures 15A, 15B, 15C, 15D:
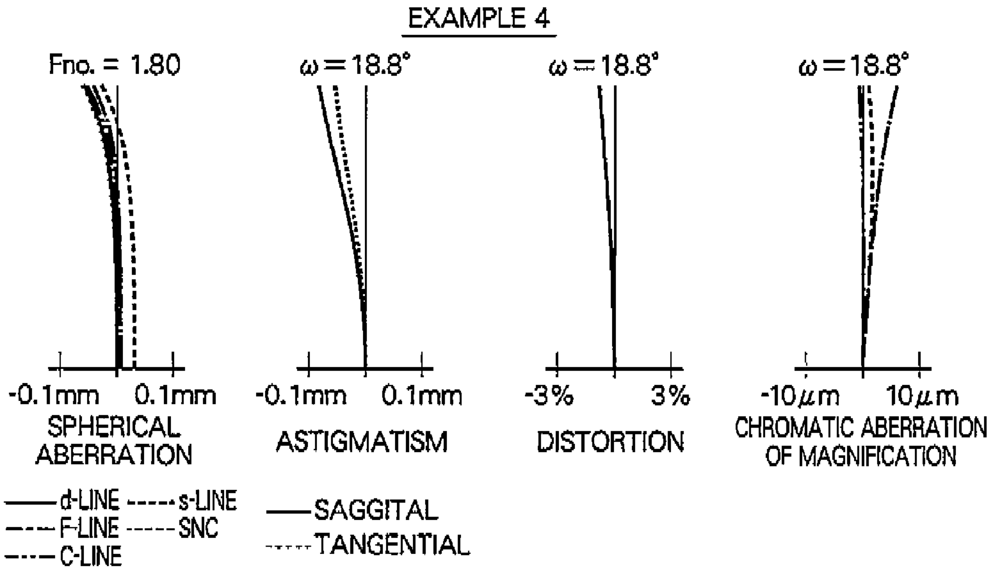
FIGS. 15A to 15D illustrate respective aberrations of the image pickup lens of Example 4 of the present invention.
Figure 16A:
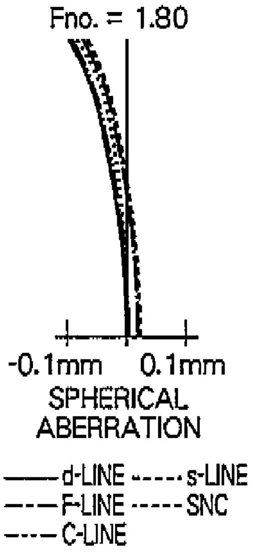
FIGS. 16A to 16D illustrate respective aberrations of the image pickup lens of Example 5 of the present invention.
Figure 16B:
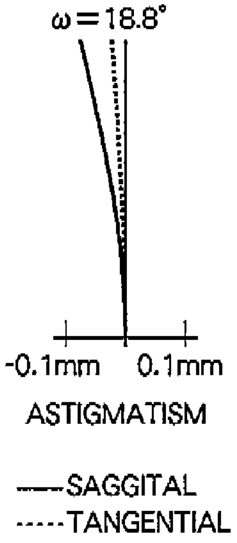
Figure 16C:
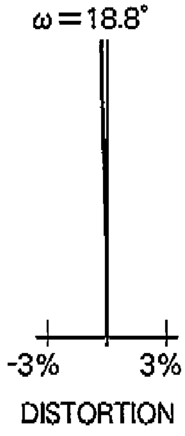
Figure 16D:
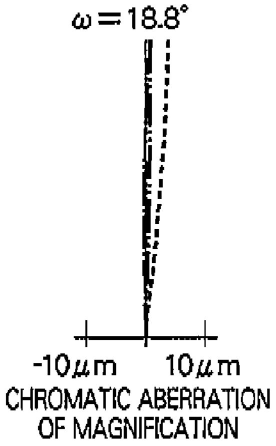

Hereinafter, embodiments of the present invention will be described with reference to the accompanying drawings. An image pickup lens according to an embodiment of the present will be described with reference to FIG. 1. FIG. 1 is a cross-sectional view of image pickup lens 1 according to an embodiment of the present invention, which corresponds to an image pickup lens of Example 1, to be described later. In FIG. 1, the right side is an object side and the left side is an image side, and on-axis light beam 2 from an object point at an infinite distance and off-axis light beams 3 and 4 at a maximum angle of view are also illustrated.

Note that FIG. 1 also shows image sensor 5 disposed on image plane Sim, considering the case in which image pickup lens 1 is applied to an image pickup apparatus. The image sensor 5 is a device that converts an optical image formed by image pickup lens 1 to an electrical signal and is constituted, for example, by a CCD image sensor, a CMOS image sensor, or the like.

Image pickup lens 1 includes from the object side in the order of first lens L1 having a negative power and a meniscus shape with a concave surface on the image side, second lens L2 having a positive power, third lens L3 having a negative power, fourth lens L4 having a positive power, fifth lens L5 having a positive power, and sixth lens L6 having a negative power and a meniscus shape with a concave surface on the object side.

In the image pickup lens of the present invention, it is preferable that aperture stop St is disposed between second lens L2 and third lens L3 as in the example shown in FIG. 1 or between third lens L3 and fourth lens L4 as in examples to be described later. Arrangement of aperture stop St at a position relatively close to the intermediate position of the lens system allows the light beam height at the object side surface of first lens L1 to be reduced. A low light beam height results in a reduced effective diameter of first lens L1 and allows the outer diameter of first lens L1 to be reduced, whereby reduction in the size and cost may be achieved. Further, a small outer diameter results in a small area of the lens exposed to the outside environment. For example, in a case where image pickup lens 1 is mounted in a vehicle camera, there is a demand that a lens portion exposed to the outside is made as small as possible in order not to impair the appearance of the vehicle. Thus, image pickup lens 1 of the present embodiment can meet the demand.

While taking in a light beam with a wide angle of view, image pickup lens 1 may reduce distortion and satisfactorily correct field curvature by forming first lens L1 as a negative meniscus lens with a concave surface on the image side.

Preferably, positive second lens L2 has a convex surface on the object side, and such a shape allows field curvature to be satisfactorily corrected. Preferably, the absolute value of the radius of curvature of the object side surface of second lens L2 is smaller than the absolute value of the radius of curvature of the image side surface of second lens L2, and such a shape allows field curvature to be further satisfactorily corrected. Further, it is preferable that second lens L2 is a bi-convex lens, and formation of second lens L2 as a bi-convex lens allows field curvature to be still further satisfactorily corrected.

As aperture stop St is preferable to be disposed at the aforementioned position, third lens L3 is located adjacent to aperture stop St. Preferably, negative third lens L3 located at such position is a bi-concave lens, and such a shape allows third lens L3 to have a strong negative power and axial chromatic aberration to be corrected satisfactorily.

Preferably, the absolute value of the radius of curvature of the object side surface of positive fourth lens L4 is larger than the absolute value of the radius of curvature of the image side surface of fourth lens L4, and such a shape allows field curvature to be satisfactorily corrected. Note that the object side surface of fourth lens L4 may be a flat surface as in the example shown in FIG. 1, and if that is the case, the manufacturing cost may be reduced significantly.

Preferably, fifth lens L5 disposed on the most image plane side among the positive lenses is a bi-convex lens, and such a shape allows lateral chromatic aberration and field curvature to be corrected satisfactorily.

Formation of sixth lens L6 disposed on the most image plane side as a negative meniscus lens with a concave surface on the object side allows lateral chromatic aberration and field curvature to be corrected satisfactorily. Further, formation of sixth lens L6 as a meniscus lens with a concave surface on the object side may result in improved telecentricity in comparison with a case in which sixth lens L6 is formed as a bi-concave lens.

Further, image pickup lens 1 is configured to satisfy Conditional Expression (1) given below.

$$-3.0<f1/f2<-1.6 \qquad (1)$$

where, f1: a focal length of first lens L1, and f2: a focal length of second lens L2.

Conditional Expression (1) above is related to the power ratio between first lens L1 and second lens L2. Negative first lens L1 and positive second lens L2 can be regarded as a pair of negative and positive lenses. In the lens system of six elements having the powers and shapes described above, setting of the power ratio of the lens pair disposed on the most object side to satisfy Conditional Expression (1) allows high optical performance to be realized easily while ensuring a small F-number. If f1/f2 exceeds the upper limit of Conditional Expression (1), the negative power of first lens L1 becomes too strong to correct distortion with ease. On the other hand, if f1/f2 exceeds the lower limit of Conditional Expression (1), the positive power of second lens L2 becomes too strong to satisfactorily correct field curvature.

Image pickup lens 1 of the present embodiment configured in the manner described above is advantageous for realizing downsizing, high performance, and a small F-number, so that a configuration in which an aspherical lens is not necessarily used or a configuration in which all lenses are uncemented single lenses, as in the example shown in FIG. 1, may be employed. The configuration in which all lenses used are spherical lenses or the configuration in which all lenses used are single lenses allows cost reduction. In addition, the configuration in which all lenses used are single lenses results in improved environmental resistance.

Preferably, present image pickup lens 1 satisfies Conditional Expressions (2) to (8) given below. A preferred embodiment may satisfy any one of the following Conditional Expressions (2) to (8) or any combination thereof.

$$15.0<\nu d1-\nu d2<30.0 \qquad (2)$$

$$1.0<f3456/f \qquad (3)$$

$$0.5<f5/f<1.5 \qquad (4)$$

$$-1.5<f6/f<-0.6 \qquad (5)$$

$$-1.2<f3/f<-0.3 \qquad (6)$$

$$-1.0<R9/f<-0.5 \qquad (7)$$

$$0.5<f4/f5<1.5 \qquad (8)$$

where,

νd1: an Abbe number of first lens L1 with respect to d-line;

νd2: an Abbe number of second lens L2 with respect to d-line;

f3456: a combined focal length from third lens L3 to sixth lens L6 (third lens L3, fourth lens L4, fifth lens L5, and sixth lens L6);

f: a focal length of the entire lens system;

f3: a focal length of third lens L3;

f4, a focal length of fourth lens L4;

f5, a focal length of fifth lens L5;

f6, a focal length of sixth lens L6; and

R9: a radius of curvature of the image side surface of fourth lens L4.

Conditional Expression (2) is related to difference in Abbe number between negative and positive lens pair disposed on the most object side. Lateral chromatic aberration may be maintained well by satisfying Conditional Expression (2). By satisfying the lower limit of Conditional Expression (2), the Abbe number of second lens L2 disposed on the object side of aperture stop St and has a positive power may be decreased and the Abbe number of first lens L1 disposed on the object side of aperture stop St and has a negative power may be increased. The decrease in the Abbe number of the positive lens disposed on the object side of aperture stop St allows lateral chromatic aberration to be satisfactorily corrected with ease. Further, the increase in the Abbe number of first lens L1 which is a negative lens disposed on the object side of aperture stop St allows the occurrence of lateral chromatic aberration by the lens to be prevented. If νd1−νd2 exceeds the upper limit of Conditional Expression (2), correction of axial chromatic aberration becomes difficult and it is difficult to obtain a favorable image, although lateral chromatic aberration may be corrected easily.

If f3456/f exceeds the lower limit of Conditional Expression (3), correction of field curvature becomes difficult and a back focus becomes short, causing it difficult to insert various types of filters, a cover glass, or the like between the lens system and image plane Sim.

If f5/f exceeds the upper limit of Conditional Expression (4), the powers of fourth lens L4 and fifth lens L5 are ill-balanced, making it difficult to correct spherical aberration, and the power of fifth lens L5 becomes too weak, making it difficult to correct lateral chromatic aberration between fifth lens L5 and sixth lens L6. If f5/f exceeds the lower limit of Conditional Expression (4), the power of fifth lens L5 becomes too strong, making it difficult to correct field curvature.

If f6/f exceeds the upper limit of Conditional Expression (5), the power of sixth lens L6 becomes weak, making it difficult to correct lateral chromatic aberration between fifth lens L5 and sixth lens L6 and to correct field curvature. If f6/f exceeds the lower limit of Conditional Expression (5), the power of sixth lens becomes too strong, causing a large performance change due to eccentricity. Consequently, tolerances of manufacturing and assembly errors for sixth lens L6 are reduced, causing assembly difficulty and increased cost, in addition to the difficulty in correcting spherical aberration.

If f3/f exceeds the upper limit of Conditional Expression (6), the power of third lens L3 becomes too strong, causing a large performance change due to eccentricity. Consequently, the tolerance of manufacturing errors or assembly errors is reduced, causing the assembly to be difficult and increased cost. If f3/f exceeds the lower limit of Conditional Expression (6), the power of third lens L3 becomes weak, making it difficult to correct axial chromatic aberration.

If R9/f exceeds the upper limit of Conditional Expression (7), it is difficult to satisfactorily correct field curvature. If R9/f exceeds the lower limit of Conditional Expression (7), it is difficult to satisfactorily correct spherical aberration.

By satisfying Conditional Expression (8), positive power may be distributed appropriately, resulting in large tolerances of manufacturing and assembly errors of positive lenses and satisfactory correction of spherical aberration. If f4/f5 exceeds the upper limit of Conditional Expression (8), tolerances of manufacturing and assembly errors for fifth lens L5 are reduced, causing assembly difficulty and increased cost, in addition to the difficulty in correcting spherical aberration. If f4/f5 exceeds the lower limit of Conditional Expression (8), tolerances of manufacturing and assembly errors for fourth lens L4 are reduced and correction of field curvature becomes difficult or the power of fifth lens L5 becomes weak, making it difficult to correct lateral chromatic aberration.

It is more preferable that present image pickup lens 1 satisfies any one of following Conditional Expressions (1-1) to (8-1) or any combination thereof.

$$-2.8<f1/f2<-1.9 \tag{1-1}$$

$$16.0<\nu d1-\nu d2<30.0 \tag{2-1}$$

$$1.2<f3456/f<5 \tag{3-1}$$

$$0.6<f5/f<1.4 \tag{4-1}$$

$$-1.2<f6/f<-0.8 \tag{5-1}$$

$$-1.1<f3/f<-0.4 \tag{6-1}$$

$$-0.9<R9/f<-0.6 \tag{7-1}$$

$$0.6<f4/f5<1.4 \tag{8-1}$$

When image pickup lens 1 satisfies the upper limit of Conditional Expression (3-1), a long back focus may be provided. When each of Conditional Expressions (1-1) to (8-1) having a smaller upper limit value in comparison with that of each of Conditional Expressions (1), (2), and (4) to (8) is satisfied, the advantageous effect that may be obtained by satisfying the upper limit of each of Conditional Expressions (1) to (8) may be further enhanced. Further, when each of Conditional Expressions (1-1) to (8-1) having a larger upper limit value in comparison with that of each of Conditional Expressions (1) to (8) is satisfied, the advantageous effect that may be obtained by satisfying the lower limit of each of Conditional Expressions (1) to (8) may be further enhanced.

It is still more preferable that present image pickup lens 1 satisfies any one of following Conditional Expressions (2-2) to (6-2) and (8-2) or any combination thereof.

$$18.0<\nu d1-\nu d2<25.0 \tag{2-2}$$

$$1.4<f3456/f<4 \tag{3-2}$$

$$0.8<f5/f<1.2 \tag{4-2}$$

$$-1.3<f6/f<-0.9 \tag{5-2}$$

$$-1.0<f3/f<-0.5 \tag{6-2}$$

$$0.7<f4/f5<1.2 \tag{8-2}$$

When each of Conditional Expressions (2-2) to (6-2) and (8-2) having a smaller upper limit value in comparison with that of each of Conditional Expressions (2-1) to (6-1) and (8-1) is satisfied, the advantageous effect that may be obtained by satisfying the upper limit of each of Conditional Expressions (2-1) to (6-1) and (8-1) may be further enhanced. When each of Conditional Expressions (2-2) to (6-2) and (8-2) having a larger lower limit value in comparison with that of each of Conditional Expressions (2-1) to (6-1) and (8-1) is satisfied, the advantageous effect that may be obtained by satisfying the lower limit of each of Conditional Expressions (2-1) to (6-1) and (8-1) may be further enhanced.

Preferably, the Abbe number of each lens with respect to d-line is set in the following manner. In a preferred embodiment, the Abbe number of any one of the lenses may be set in the following manner or the Abbe numbers of any combination of the lenses may be set in the following manner.

Preferably, the Abbe number of first lens L1 with respect to d-line is not less than 40, which may prevent chromatic aberration and realize satisfactory optical performance.

It is more preferable that the Abbe number of first lens L1 with respect to d-line is not less than 49, in which case chromatic aberration is prevented more easily and satisfactory optical performance is realized. In order to prevent chromatic aberration and realize satisfactory optical performance, it is further preferable that the Abbe number of first lens L1 with respect to d-line is not less than 55.

Preferably, the Abbe number of second lens L2 with respect to d-line is not less than 32. If the Abbe number of second lens L2 with respect to d-line is less than 32, it is difficult to satisfactorily correct axial chromatic aberration. In order to prevent axial chromatic aberration and realize more satisfactory optical performance, it is more preferable that the Abbe number of second lens L2 with respect to d-line is not less than 40.

Preferably, the Abbe number of third lens L3 with respect to d-line is not greater than 30, which may prevent axial chromatic aberration and realize satisfactory optical performance.

It is more preferable that the Abbe number of third lens L3 with respect to d-line is not greater than 25, in which case axial chromatic aberration is prevented more easily and satisfactory optical performance is realized.

It is still more preferable that the Abbe number of third lens L3 with respect to d-line is not greater than 20, in which case it is further easier to prevent chromatic aberration and realize satisfactory optical performance.

Preferably, the Abbe number of fourth lens L4 with respect to d-line is not less than 35, which may prevent chromatic aberration and realize satisfactory optical performance.

It is more preferable that the Abbe number of fourth lens L4 with respect to d-line is not less than 40, in which case it is easier to prevent chromatic aberration and realize satisfactory optical performance.

Preferably, the Abbe number of fifth lens L5 with respect to d-line is not less than 35, which may prevent chromatic aberration and realize satisfactory optical performance.

It is more preferable that the Abbe number of fifth lens L5 with respect to d-line is not less than 40, in which case it is easier to prevent chromatic aberration and realize satisfactory optical performance.

Preferably, the Abbe number of sixth lens L6 with respect to d-line is not greater than 30, which allows axial chromatic aberration and lateral chromatic aberration to be corrected easily and satisfactorily.

It is more preferable that the Abbe number of sixth lens L6 with respect to d-line is not greater than 28, in which case axial chromatic aberration and lateral chromatic aberration may be corrected more easily.

It is still further preferable that the Abbe number of sixth lens L6 with respect to d-line is not greater than 20, in which case axial chromatic aberration and lateral chromatic aberration may be corrected still more easily.

The position of aperture stop St is not limited to that shown in FIG. 1. If, however, the lens group on the object side of aperture stop St (first lens L1 and second lens L2) is regarded as a front group and the lens group on the image side of aperture stop St (third lens L3 to sixth lens L6) is regarded as a rear group, both the front and rear groups are positive lens groups in the example shown in FIG. 1. In the configuration in which both the front and rear groups are positive lens groups, the power assignment becomes symmetrical with respect to aperture stop St which is advantageous for the correction of lateral chromatic aberration.

When the image pickup lens of the present invention is expected to be used under a severe environment, such as in a vehicle camera or the like, it is preferable that first lens L1 disposed on the most object side is made of a material which is resistant to surface degradation by the weather, temperature change by direct sunlight, and chemicals, such as grease, detergent, and the like, that is, a material having high water resistance, weather resistance, acid resistance, chemical resistance, and the like. For example, a material with water resistance of 1 by powder method defined by Japan Optical Glass Industries Association is preferably used. Further, the material of first lens L1 may sometimes be required to be rigid and not broken easily. Use of glass may satisfy the aforementioned requirements. Alternatively, transparent ceramics may be used as the material of first lens L1.

Preferably the center thickness of first lens L1 is not less than 1 mm in order to ensure strength. A center thickness of not less than 1 mm makes first lens L1 less prone to breakage.

A protection means may be provided on the object side surface of first lens L1 for improving the strength, scratch resistance, and chemical resistance. In such a case, the material of first lens L1 may be a plastic. The protection means may be a hard coating or a water-repellent coating.

If the image pickup lens is applied, for example, to a vehicle camera, it is necessary to be usable in a wide temperature range from an open air temperature in a cold weather region to an in-vehicle temperature in summer of a tropical region. When the image pickup lens is used in a wide temperature range, it is preferable that a material with a small linear expansion coefficient is used as the material of the lens. Where the image pickup lens is expected to be used in a wide temperature range, such as vehicle camera applications, it is preferable that all of the lenses are made of glass.

Where a priority is put on the performance, an aspherical lens may be used for satisfactory correction of aberrations. If that is the case, a plastic may be used as the material of the lens in order to accurately form an aspherical shape inexpensively.

A light beam passing through outside of the effective diameter of each lens may possibly reach the image plane as stray light and become ghost. It is, therefore, preferable that the image pickup lens is provided with a light blocking means for blocking the stray light as required. As for the light blocking means, for example, an opaque coating material may be applied or an opaque plate may be provided on a portion of the image side surface of each lens outside of the effective diameter. Alternatively, an opaque plate may be provided in the optical path of a light beam that becomes stray light as the light blocking means. Otherwise, a hood or the like may be disposed at a position on the object side of the most object side lens. As an example, FIG. 1 illustrates light blocking means 11 provided on the image side surface of first lens L1, but the position for providing a light blocking means is not limited to that shown in FIG. 1 and light blocking means may be provided on any other lens or between lenses.

Further, a member, such as an aperture or the like, for blocking a marginal ray to the extent that does not cause a problem in the relative illumination may be disposed between each lens. The term "marginal ray" as used herein refers to a light beam of those from an object point outside of optical axis Z passing through a peripheral portion of the entrance pupil of an optical system. By disposing a member for blocking a marginal ray in this way, the quality in a peripheral portion of an image may be improved. Further, by blocking light that causes ghost, ghost may be reduced.

When image pickup lens 1 is applied to an image pickup apparatus, it is preferable that a cover glass, a low-pass filter, or an infrared light cut filter is provided according to the structure of the camera on which the lens is mounted. For example, if image pickup lens is employed in a vehicle camera and the camera is used as a nigh vision camera for nighttime visual assistance, a filter for cutting ultraviolet light to blue light may be used. The cover glass and various types of filters described above may be disposed, for example, between the most image side lens and image plane Sim or between each lens. Alternatively, a coating that behaves similar to each of the filters described above may be applied on a lens surface of any one of the lenses of image pickup lens 1.

Numerical examples of image pickup lens of the present invention will now be described. Cross-sectional views of image pickup lenses of Examples 1 to 10 are illustrated in FIGS. 2 to 11 respectively. In each of FIGS. 2 to 11, the left side is an object side and right side is an image side, and aperture stop St and image sensor 5 disposed on image plane Sim are also shown, as in FIG. 1. Aperture stop St in each drawing is not necessarily depicted in an actual size and a shape but to indicate the position on optical axis Z. In each example, symbols Ri, Di (i=1, 2, 3, - - - ) in the lens cross-sectional view correspond to lens data Ri, Di to be described in the following.

Lens data of image pickup lenses of Examples 1 to 10 and other various data are shown in Tables 1 to 10 respectively. Hereinafter, symbols in the tables will be described by taking Example 1 as example, but symbols in other Examples are basically identical to those of Example 1.

In the lens data of Table 1, si column represents $i^{th}$ (i=1, 2, 3, - - - ) surface number, which is gradually incremented toward image side with the surface of the component disposed on the most object side being taken as the first surface. The lens data shown in Table 1 include aperture stop St and the surface number field corresponding to the aperture stop St also includes "(Aperture Stop)".

The Ri column in Table 1 represents a radius of curvature of $i^{th}$ (i=1, 2, 3, - - - ) surface and the Di column represents a surface distance between $i^{th}$ (i=1, 2, 3, - - - ) surface and $i^{th}+1$ surface on optical axis Z. Further, in the lens data of Table 1, Ndj column represents a refractive index of $j^{th}$ lens (j=1, 2, 3, - - - ) with respect to d-line (wavelength of 587.6 nm), which is gradually incremented toward the image side with the lens disposed at the most object side being taken as the first lens. The νdj column represents an Abbe number of $j^{th}$ optical element with respect to d-line. In the Ri column of Table 1, a positive sign is used if the surface is convex on the object side and a negative sign is used if the surface is convex on the image side.

In various data of Table 1, the following represent the following: Fno. is F-number; 2ω is total angle of view; L is distance from the object side surface of first lens L1 to image plane Sim on optical axis Z; Bf is back focus, f is focal length of the entire system; f1 is focal length of first lens L1, f2 is focal length of second lens L2; f3 is focal length of third lens L3; f4 is focal length of fourth lens L4; f5 is focal length of fifth lens L5; f6 is focal length of sixth lens L6; and f3456 is combined focal length of third lens L3 to sixth lens L6.

Table 1 includes numerical values rounded to a predetermined number of significant digits. In various data in Table 1, unit for angles is "degree" and unit for lengths is "mm". But, these are only examples, and other appropriate units may also be used since identical optical performance may be obtained from an optical system when it is proportionally enlarged or reduced.

(Table 1)

EXAMPLE 1 LENS DATA

| Si | Ri | Di | Ndj | νdj |
|---|---|---|---|---|
| 1 | 8.6572 | 1.7900 | 1.58913 | 61.1 |
| 2 | 3.9432 | 1.6700 | | |
| 3 | 8.7006 | 3.0300 | 1.88300 | 40.8 |
| 4 | −18.0073 | 0.3700 | | |
| 5 (APERTURE STOP) | ∞ | 0.7100 | | |
| 6 | −11.5705 | 0.9500 | 1.92286 | 18.9 |
| 7 | 17.0984 | 0.4000 | | |
| 8 | ∞ | 2.9000 | 1.88300 | 40.8 |
| 9 | −6.8482 | 0.1500 | | |
| 10 | 22.9780 | 3.1000 | 1.88300 | 40.8 |
| 11 | −11.7631 | 1.0800 | | |
| 12 | −7.1302 | 0.8300 | 1.92286 | 18.9 |
| 13 | −50.0658 | 4.1955 | | |
| 14 (IMAGE PLANE) | ∞ | | | |

-continued

EXAMPLE 1 VARIOUS DATA

| | |
|---|---|
| Fno. | 1.80 |
| L | 21.2 |
| Bf | 4.2 |
| f | 8.46 |
| f1 | −14.31 |
| f2 | 7.02 |
| f3 | −7.36 |
| f4 | 7.76 |
| f5 | 9.20 |
| f6 | −9.09 |
| f3456 | 16.61 |

TABLE 2

EXAMPLE 2 LENS DATA

| Si | Ri | Di | Ndj | νdj |
|---|---|---|---|---|
| 1 | 12.7707 | 2.0000 | 1.58913 | 61.1 |
| 2 | 4.8684 | 1.8000 | | |
| 3 | 7.5351 | 2.7000 | 1.88300 | 40.8 |
| 4 | −26.6370 | 1.0585 | | |
| 5 (APERTURE STOP) | ∞ | 0.7000 | | |
| 6 | −7.6244 | 0.8678 | 1.92286 | 18.9 |
| 7 | 17.9921 | 0.1500 | | |
| 8 | ∞ | 2.9000 | 1.88300 | 40.8 |
| 9 | −6.9508 | 0.1500 | | |
| 10 | 11.0782 | 3.5000 | 1.72000 | 43.7 |
| 11 | −11.0782 | 0.9000 | | |
| 12 | −7.1998 | 0.8000 | 1.84666 | 23.8 |
| 13 | −60.0032 | 4.0958 | | |
| 14 (IMAGE PLANE) | ∞ | | | |

EXAMPLE 2 VARIOUS DATA

| | |
|---|---|
| Fno. | 1.80 |
| L | 21.8 |
| Bf | 4.1 |
| f | 8.75 |
| f1 | −14.74 |
| f2 | 6.91 |
| f3 | −5.71 |
| f4 | 7.87 |
| f5 | 8.24 |
| f6 | −9.73 |
| f3456 | 16.61 |

TABLE 3

EXAMPLE 3 LENS DATA

| Si | Ri | Di | Ndj | νdj |
|---|---|---|---|---|
| 1 | 8.4990 | 1.8000 | 1.58913 | 61.1 |
| 2 | 4.2069 | 1.7998 | | |
| 3 | 7.5545 | 3.0042 | 1.88300 | 40.8 |
| 4 | −19.9847 | 0.2694 | | |
| 5 (APERTURE STOP) | ∞ | 0.7086 | | |
| 6 | −9.2005 | 0.8000 | 1.92286 | 18.9 |
| 7 | 14.2958 | 0.4000 | | |
| 8 | ∞ | 2.9000 | 1.88300 | 40.8 |
| 9 | −6.8453 | 0.1500 | | |
| 10 | 23.0023 | 3.0000 | 1.88300 | 40.8 |
| 11 | −12.0003 | 1.0000 | | |
| 12 | −7.1995 | 0.8000 | 1.76182 | 26.5 |
| 13 | −71.2875 | 4.2478 | | |
| 14 (IMAGE PLANE) | ∞ | | | |

TABLE 3-continued

| EXAMPLE 3 VARIOUS DATA | |
|---|---|
| Fno. | 1.80 |
| L | 20.9 |
| Bf | 4.2 |
| f | 8.76 |
| f1 | −16.74 |
| f2 | 6.54 |
| f3 | −5.97 |
| f4 | 7.75 |
| f5 | 9.31 |
| f6 | −10.57 |
| f3456 | 20.68 |

TABLE 4

EXAMPLE 4 LENS DATA

| Si | Ri | Di | Ndj | ν dj |
|---|---|---|---|---|
| 1 | 12.9938 | 2.0504 | 1.58913 | 61.1 |
| 2 | 5.1814 | 1.3492 | | |
| 3 | 7.4942 | 2.7000 | 1.88300 | 40.8 |
| 4 | −26.9257 | 0.2500 | | |
| 5 (APERTURE STOP) | ∞ | 1.5804 | | |
| 6 | −6.4188 | 0.9794 | 1.92286 | 18.9 |
| 7 | 18.9989 | 0.4000 | | |
| 8 | ∞ | 2.9000 | 1.85026 | 32.3 |
| 9 | −6.5698 | 0.1500 | | |
| 10 | 11.0014 | 3.0264 | 1.75500 | 52.3 |
| 11 | −11.0014 | 1.0000 | | |
| 12 | −7.4967 | 0.8372 | 1.84666 | 23.8 |
| 13 | −69.4406 | 4.2332 | | |
| 14 (IMAGE PLANE) | ∞ | | | |

| EXAMPLE 4 VARIOUS DATA | |
|---|---|
| Fno. | 1.80 |
| L | 21.5 |
| Bf | 4.2 |
| f | 8.88 |
| f1 | −16.21 |
| f2 | 6.89 |
| f3 | −5.10 |
| f4 | 7.73 |
| f5 | 7.74 |
| f6 | −9.99 |
| f3456 | 14.42 |

TABLE 5

EXAMPLE 5 LENS DATA

| Si | Ri | Di | Ndj | ν dj |
|---|---|---|---|---|
| 1 | 8.4998 | 2.0000 | 1.58913 | 61.1 |
| 2 | 4.1128 | 2.2968 | | |
| 3 | 8.0308 | 3.0634 | 1.88300 | 40.8 |
| 4 | −16.6106 | 0.2578 | | |
| 5 (APERTURE STOP) | ∞ | 0.7074 | | |
| 6 | −10.0292 | 0.8000 | 1.92286 | 18.9 |
| 7 | 17.0000 | 0.4000 | | |
| 8 | ∞ | 2.9000 | 1.83598 | 45.5 |
| 9 | −7.0107 | 0.1500 | | |
| 10 | 23.0000 | 3.0000 | 1.83588 | 44.2 |
| 11 | −12.0000 | 1.0000 | | |
| 12 | −6.0962 | 0.8000 | 1.71764 | 29.4 |
| 13 | −39.9997 | 4.1501 | | |
| 14 (IMAGE PLANE) | ∞ | | | |

TABLE 5-continued

| EXAMPLE 5 VARIOUS DATA | |
|---|---|
| Fno. | 1.80 |
| L | 21.5 |
| Bf | 4.2 |
| f | 8.82 |
| f1 | −16.28 |
| f2 | 6.51 |
| f3 | −6.74 |
| f4 | 8.39 |
| f5 | 9.82 |
| f6 | −10.12 |
| f3456 | 27.83 |

TABLE 6

EXAMPLE 6 LENS DATA

| Si | Ri | Di | Ndj | ν di |
|---|---|---|---|---|
| 1 | 8.4997 | 2.0000 | 1.58913 | 61.1 |
| 2 | 4.1863 | 2.1989 | | |
| 3 | 8.0259 | 3.0022 | 1.83481 | 42.7 |
| 4 | −17.7358 | 0.2556 | | |
| 5 (APERTURE STOP) | ∞ | 0.7000 | | |
| 6 | −8.1279 | 0.8000 | 1.92286 | 18.9 |
| 7 | 26.4571 | 0.4003 | | |
| 8 | ∞ | 2.9000 | 1.83400 | 37.2 |
| 9 | −6.8778 | 0.1500 | | |
| 10 | 15.9999 | 2.8500 | 1.77250 | 49.6 |
| 11 | −11.0362 | 1.0000 | | |
| 12 | −6.1322 | 0.8000 | 1.75520 | 27.5 |
| 13 | −69.4406 | 4.4926 | | |
| 14 (IMAGE PLANE) | ∞ | | | |

| EXAMPLE 6 VARIOUS DATA | |
|---|---|
| Fno. | 1.80 |
| L | 21.5 |
| Bf | 4.5 |
| f | 8.87 |
| f1 | −16.91 |
| f2 | 6.99 |
| f3 | −6.66 |
| f4 | 8.25 |
| f5 | 8.86 |
| f6 | −8.96 |
| f3456 | 22.49 |

TABLE 7

EXAMPLE 7 LENS DATA

| Si | Ri | Di | Ndj | ν dj |
|---|---|---|---|---|
| 1 | 8.4988 | 1.8000 | 1.58913 | 61.1 |
| 2 | 3.8706 | 1.7493 | | |
| 3 | 8.7083 | 3.0090 | 1.88300 | 40.8 |
| 4 | −17.9997 | 1.0642 | | |
| 5 | −11.9847 | 0.8156 | 1.92286 | 18.9 |
| 6 | 17.0000 | 0.2000 | | |
| 7 (APERTURE STOP) | ∞ | 0.2000 | | |
| 8 | ∞ | 2.9205 | 1.88300 | 40.8 |
| 9 | −6.8698 | 0.1500 | | |
| 10 | 22.9994 | 3.1001 | 1.88300 | 40.8 |
| 11 | −11.6623 | 1.1000 | | |
| 12 | −6.9111 | 0.8014 | 1.92286 | 18.9 |
| 13 | −49.9999 | 4.1743 | | |
| 14 (IMAGE PLANE) | ∞ | | | |

TABLE 7-continued

| EXAMPLE 7 VARIOUS DATA | |
|---|---|
| Fno. | 1.80 |
| 2ω | 39.4 |
| L | 21.1 |
| Bf | 4.2 |
| f | 8.43 |
| f1 | −14.10 |
| f2 | 7.02 |
| f3 | −7.52 |
| f4 | 7.78 |
| f5 | 9.15 |
| f6 | −8.77 |
| f3456 | 17.16 |

TABLE 8

EXAMPLE 8 LENS DATA

| Si | Ri | Di | Ndj | ν dj |
|---|---|---|---|---|
| 1 | 8.4973 | 2.0033 | 1.58913 | 61.1 |
| 2 | 4.2136 | 2.2154 | | |
| 3 | 7.9815 | 3.0096 | 1.88300 | 40.8 |
| 4 | −19.8735 | 0.9631 | | |
| 5 | −9.2018 | 0.8000 | 1.92286 | 18.9 |
| 6 | 15.6716 | 0.4000 | | |
| 7 (APERTURE STOP) | ∞ | 0.0000 | | |
| 8 | ∞ | 2.9000 | 1.88300 | 40.8 |
| 9 | −7.0728 | 0.1500 | | |
| 10 | 22.9998 | 3.0000 | 1.88300 | 40.8 |
| 11 | −12.0003 | 1.0000 | | |
| 12 | −7.0686 | 0.8000 | 1.76182 | 26.5 |
| 13 | −59.9968 | 4.5488 | | |
| 14 (IMAGE PLANE) | ∞ | | | |

| EXAMPLE 8 VARIOUS DATA | |
|---|---|
| Fno. | 1.80 |
| 2ω | 37.6 |
| L | 21.8 |
| Bf | 4.5 |
| f | 8.86 |
| f1 | −17.16 |
| f2 | 6.79 |
| f3 | −6.19 |
| f4 | 8.01 |
| f5 | 9.30 |
| f6 | −10.59 |
| f3456 | 21.38 |

TABLE 9

EXAMPLE 9 LENS DATA

| Si | Ri | Di | Ndj | ν dj |
|---|---|---|---|---|
| 1 | 13.0612 | 2.2321 | 1.58913 | 61.1 |
| 2 | 5.1470 | 1.2341 | | |
| 3 | 7.5618 | 2.7000 | 1.88300 | 40.8 |
| 4 | −29.0340 | 1.7515 | | |
| 5 | −6.5625 | 0.8000 | 1.92286 | 18.9 |
| 6 | 19.8827 | 0.2000 | | |
| 7 (APERTURE STOP) | ∞ | 0.2000 | | |
| 8 | ∞ | 2.9000 | 1.85026 | 32.3 |
| 9 | −6.5508 | 0.1500 | | |
| 10 | 11.0028 | 3.0323 | 1.75500 | 52.3 |
| 11 | −11.0028 | 1.0000 | | |
| 12 | −7.4992 | 0.9087 | 1.84666 | 23.8 |
| 13 | −69.4406 | 4.3025 | | |
| 14 (IMAGE PLANE) | ∞ | | | |

TABLE 9-continued

| EXAMPLE 9 VARIOUS DATA | |
|---|---|
| Fno. | 1.80 |
| 2ω | 37.6 |
| L | 21.4 |
| Bf | 4.3 |
| f | 8.88 |
| f1 | −16.10 |
| f2 | 7.04 |
| f3 | −5.27 |
| f4 | 7.70 |
| f5 | 7.75 |
| f6 | −10.00 |
| f3456 | 13.97 |

TABLE 10

EXAMPLE 10 LENS DATA

| Si | Ri | Di | Ndj | ν dj |
|---|---|---|---|---|
| 1 | 10.0494 | 2.0000 | 1.51680 | 64.2 |
| 2 | 4.2796 | 2.2967 | | |
| 3 | 7.8283 | 3.0620 | 1.88300 | 40.8 |
| 4 | −21.9342 | 0.9659 | | |
| 5 | −8.9071 | 0.8000 | 1.92286 | 18.9 |
| 6 | 17.0337 | 0.3000 | | |
| 7 (APERTURE STOP) | ∞ | 0.1000 | | |
| 8 | ∞ | 2.9002 | 1.88300 | 40.8 |
| 9 | −6.8870 | 0.1500 | | |
| 10 | 11.2181 | 3.0000 | 1.58913 | 61.1 |
| 11 | −11.2181 | 1.0000 | | |
| 12 | −6.2497 | 0.8000 | 1.75520 | 27.5 |
| 13 | −50.0000 | 4.2267 | | |
| 14 (IMAGE PLANE) | ∞ | | | |

| EXAMPLE 10 VARIOUS DATA | |
|---|---|
| Fno. | 1.80 |
| 2ω | 37.6 |
| L | 21.6 |
| Bf | 4.2 |
| f | 8.90 |
| f1 | −16.36 |
| f2 | 6.86 |
| f3 | −6.25 |
| f4 | 7.80 |
| f5 | 10.02 |
| f6 | −9.53 |
| f3456 | 27.48 |

Values of image pickup lenses of Examples 1 to 10 corresponding to Conditional Expressions (1) to (8) are shown in Table 11. Examples 1 to 10 use d-line as the reference wavelength and Table 11 indicates values at the reference wavelength. As Table 11 indicates, each of Examples 1 to 10 satisfies each of Conditional Expressions (1) to (8).

TABLE 11

| | CONDITIONAL EXPRESSION | | | | | | | |
|---|---|---|---|---|---|---|---|---|
| EXAMPLE | (1) f1/f2 | (2) ν d1-ν d2 | (3) f3456/f | (4) f5/f | (5) f6/f | (6) f3/f | (7) R9/f | (8) f4/f5 |
| 1 | −2.04 | 20.3 | 1.96 | 1.09 | −1.07 | −0.87 | −0.81 | 0.84 |
| 2 | −2.13 | 20.3 | 1.90 | 0.94 | −1.11 | −0.65 | −0.79 | 0.96 |
| 3 | −2.56 | 20.3 | 2.36 | 1.06 | −1.21 | −0.68 | −0.78 | 0.83 |
| 4 | −2.35 | 20.3 | 1.62 | 0.87 | −1.12 | −0.57 | −0.74 | 1.00 |
| 5 | −2.50 | 20.3 | 3.16 | 1.11 | −1.15 | −0.76 | −0.79 | 0.85 |
| 6 | −2.42 | 18.4 | 2.53 | 1.00 | −1.01 | −0.75 | −0.77 | 0.93 |

TABLE 11-continued

| | CONDITIONAL EXPRESSION | | | | | | | |
|---|---|---|---|---|---|---|---|---|
| EXAMPLE | (1) f1/f2 | (2) ν d1-ν d2 | (3) f3456/f | (4) f5/f | (5) f6/f | (6) f3/f | (7) R9/f | (8) f4/f5 |
| 7 | −2.01 | 20.3 | 2.04 | 1.09 | −1.04 | −0.89 | −0.82 | 0.85 |
| 8 | −2.53 | 20.3 | 2.41 | 1.05 | −1.19 | −0.70 | −0.80 | 0.86 |
| 9 | −2.29 | 20.3 | 1.57 | 0.87 | −1.13 | −0.59 | −0.74 | 0.99 |
| 10 | −2.38 | 23.4 | 3.09 | 1.13 | −1.07 | −0.70 | −0.77 | 0.78 |

Diagrams of spherical aberration, astigmatism, distortion, and lateral chromatic aberration of image pickup lens of Example 1 are shown in FIGS. 12A to 12D respectively. Each diagram shows an aberration with d-line as the reference wavelength. The diagrams of spherical aberration and lateral chromatic aberration also illustrate aberrations with respect to F-line (wavelength of 486.1 nm), C-line (wavelength of 656.3 nm), and s-line (wavelength of 852.1 nm). The diagram of spherical aberration further illustrates offence against the sine condition represented by SNC. The "Fno." in spherical aberration diagram represents an F-number and "ω" in the other diagrams represents a half angle of view. The distortion diagram illustrates an amount of displacement from an ideal image height obtained by $f \times \tan \phi$, in which f is a focal length of the entire system and $\phi$ is a half angle of view (treated as a variable, $0 \leqq \phi \leqq \omega$).

Figure 17A:
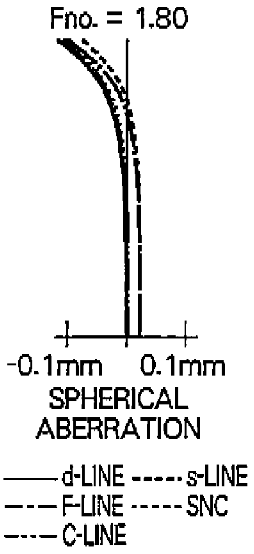
FIGS. 17A to 17D illustrate respective aberrations of the image pickup lens of Example 6 of the present invention.
Figure 17B:
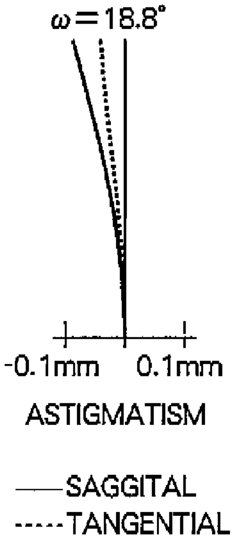
Figure 17C:
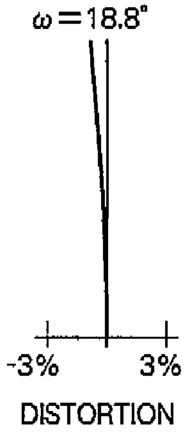
Figure 17D:
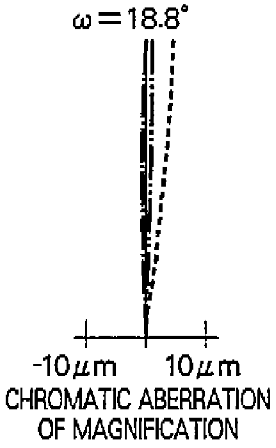
Figures 18A, 18B, 18C, 18D:
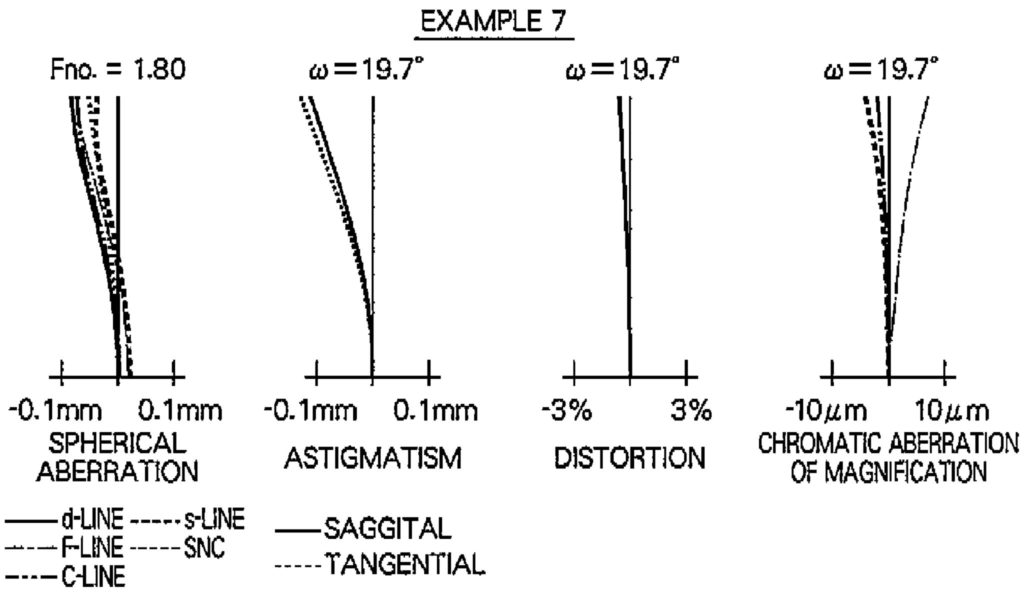
FIGS. 18A to 18D illustrate respective aberrations of the image pickup lens of Example 7 of the present invention.
Figures 19A, 19B, 19C, 19D:
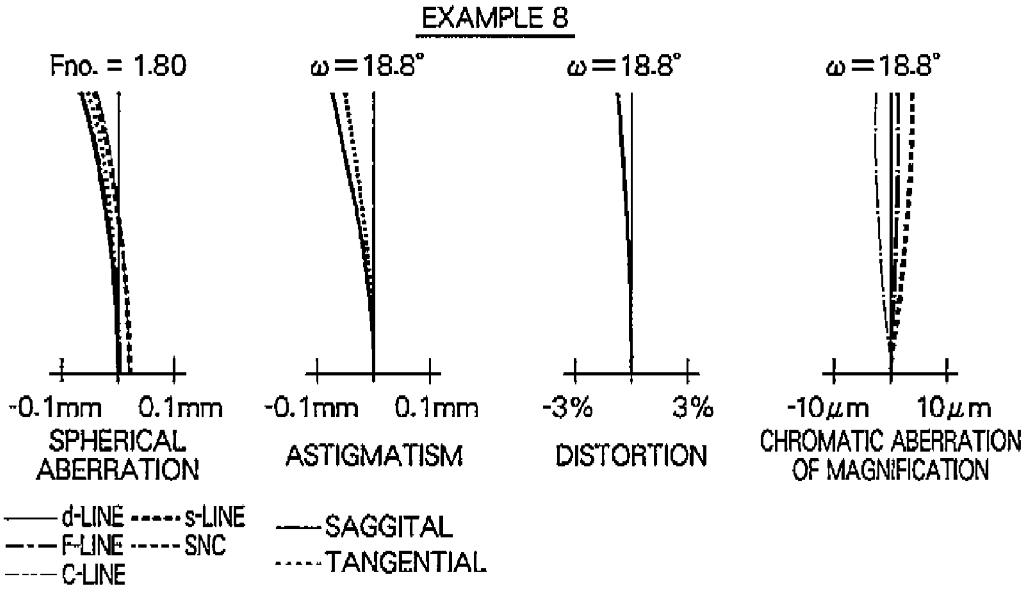
FIGS. 19A to 19D illustrate respective aberrations of the image pickup lens of Example 8 of the present invention.
Figures 20A, 20B, 20C, 20D:
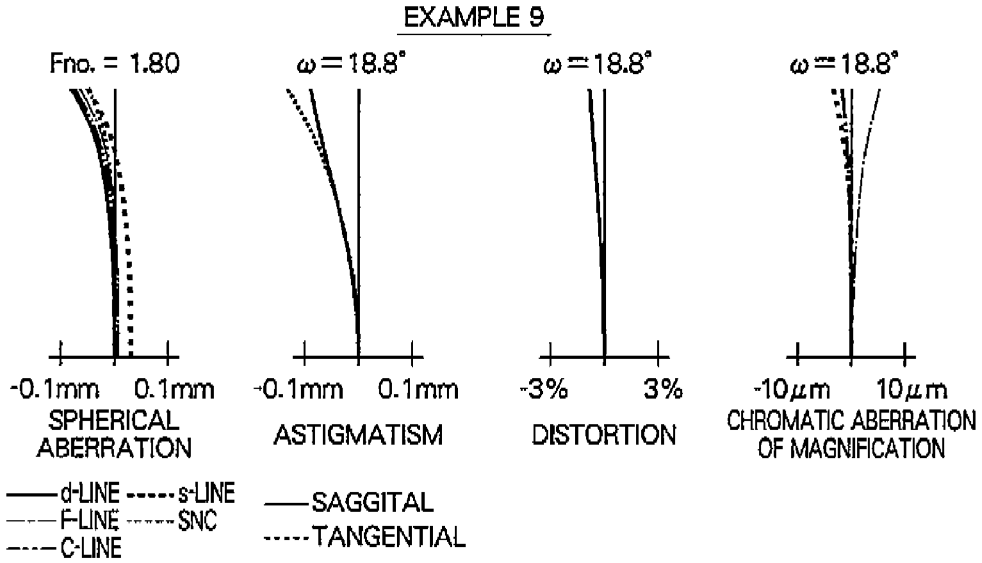
FIGS. 20A to 20D illustrate respective aberrations of the image pickup lens of Example 9 of the present invention.
Figures 21A, 21B, 21C, 21D:
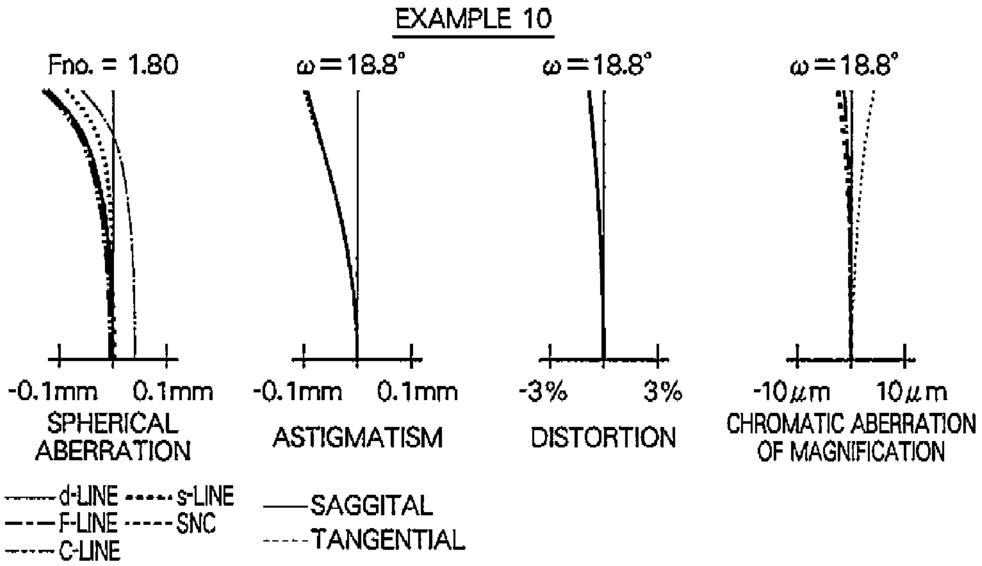
FIGS. 21A to 21D illustrate respective aberrations of the image pickup lens of Example 10 of the present invention.

Likewise, diagrams of spherical aberration, astigmatism, distortion, and lateral chromatic aberration of image pickup lens of Examples 2 to 10 are shown in FIGS. 13A to 13D, in FIGS. 14A to 14D, in FIGS. 15A to 15D, in FIGS. 16A to 16D, in FIGS. 17A to 17B, in FIGS. 18A to 18D, in FIGS. 19A to 19D, in FIGS. 20A to 20D, and in FIGS. 21A to 21D respectively. As each aberration diagram indicate, each aberration of Examples 1 to 10 is satisfactorily corrected from visible to near infrared regions.

The image pickup lens of each of Examples 1 to 10 is constituted by six lenses each of which is a bi-spherical single lens made of glass. Thus, the image pickup lens may be manufactured inexpensively and usable over a wide temperature range as the change in performance against temperature change is small. Further, the image pickup lens of each of Examples 1 to 10 may be preferably used in vehicle cameras for taking images of front, side, and rear of the vehicles, surveillance cameras, and the like, since the image pickup lens is small, and has a sufficiently small F-number and high optical performance with aberrations being satisfactorily corrected from visible to near infrared regions.

Figure 22:
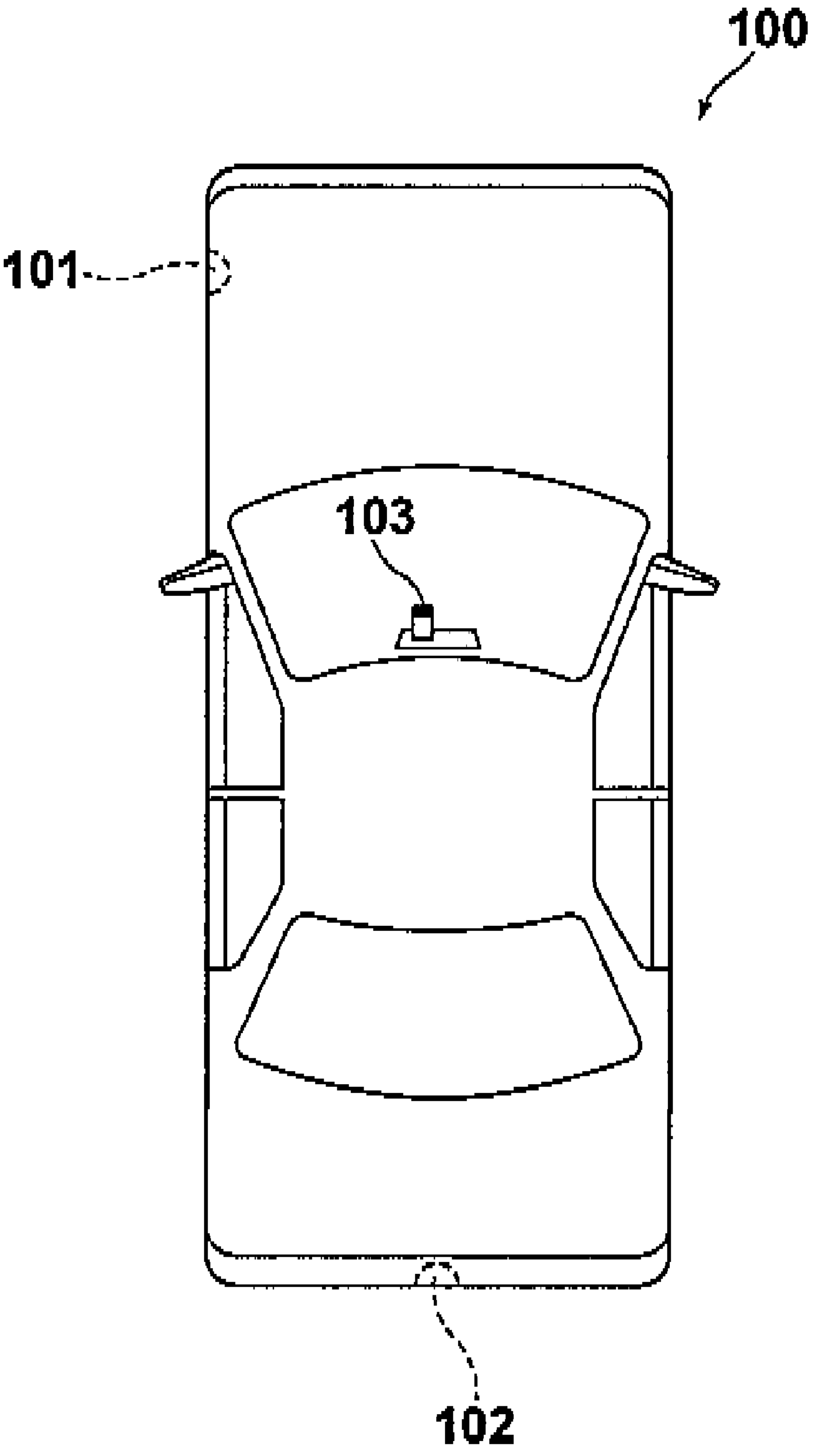
FIG. 22 illustrates a placement of a vehicle image pickup apparatus according to an embodiment of the present invention.

As a usage example, FIG. 22 illustrates automobile 100 in which an image pickup apparatus having an image pickup lens of the present invention is mounted. In FIG. 22, automobile 100 has vehicle exterior camera 101 for imaging a blind area on the front passenger seat side, vehicle exterior camera 102 for imaging a blind area on the rear side, and in-vehicle camera 103 attached to the rear side of a rearview mirror to image a view range identical to that of a driver. Vehicle exterior camera 101, vehicle exterior camera 102, and in-vehicle camera 103 are image pickup apparatuses according to an embodiment of the present invention, and include image pickup lenses of examples of the present invention and image sensors for converting optical images formed by the image pickup lenses to electrical signals.

As image pickup lenses according to the examples of the present invention have advantageous effects described above, vehicle exterior camera 101, vehicle exterior camera 102, and in-vehicle camera 103 can be structured compactly and inexpensively, and the cameras allow satisfactory imaging under low illumination conditions, whereby quality images with high resolution may be obtained.

So far the present invention has been described by way of embodiments and examples, but the invention is not limited to the embodiments and examples described above and various modifications and changes may be made. For example, values of the radius of curvature, surface distance, refractive index, Abbe number, aspherical coefficient of each lens element are not limited to those shown in each of the numeric value examples and may take other values.

Further, in the embodiment of the image pickup apparatus, the description has been made, with reference to a drawing, of a case in which the present invention is applied to a vehicle camera. But the application of the present invention is not limited to the vehicle camera and the invention may also be applied, for example, to cameras of portable terminal devices, surveillance cameras, and the like.

What is claimed is:

1. An image pickup lens, comprising the following disposed from an object side in the order listed below:

a first lens having a negative power and a meniscus shape with a concave surface on an image side;

a second lens having a positive power;

a third lens having a negative power;

a fourth lens having a positive power;

a fifth lens having a positive power; and a sixth lens having a negative power and a meniscus shape with a concave surface on the object side, wherein the lens satisfies Conditional Expression (1) given below when a focal length of the first lens is taken as f1 and a focal length of the second lens is taken as f2

$$-3.0<f1/f2<-1.6 \quad (1).$$

2. The image pickup lens of claim 1, wherein the lens satisfies Conditional Expression (2) given below when an Abbe number of the first lens with respect to d-line is taken as νd1 and an Abbe number of the second lens with respect to d-line is taken as νd2

$$15.0<\nu d1-\nu d2<30.0 \quad (2).$$

3. The image pickup lens of claim 1, wherein the lens satisfies Conditional Expression (3) given below when a focal length of the entire lens system is taken as f and a combined focal length from the third to sixth lenses is taken as f3456

$$1.0<f3456/f \quad (3).$$

4. The image pickup lens of claim 1, wherein the lens satisfies Conditional Expression (4) given below when a focal length of the entire lens system is taken as f and a focal length of the fifth lens is taken as f5

$$0.5<f5/f<1.5 \quad (4).$$

5. The image pickup lens of claim 1, wherein the lens satisfies Conditional Expression (5) given below when a focal length of the entire lens system is taken as f and a focal length of the sixth lens is taken as f6

$$-1.5<f6/f<-0.6 \quad (5).$$

6. The image pickup lens of claim 1, wherein the lens satisfies Conditional Expression (6) given below when a focal length of the entire lens system is taken as f and a focal length of the third lens is taken as f3

$$-1.2<f3/f<-0.3 \quad (6).$$

7. The image pickup lens of claim 1, wherein the lens satisfies Conditional Expression (7) given below when a focal length of the entire lens system is taken as f and a radius of curvature of an image side surface of the fourth lens is taken as R9

$$-1.0<R9/f<-0.5 \quad (7).$$

8. The image pickup lens of claim 1, wherein the lens satisfies Conditional Expression (8) given below when a focal length of the fourth lens is taken as f4 and a focal length of the fifth lens is taken as f5

$$0.5<f4/f5<1.5 \quad (8).$$

9. The image pickup lens of claim 1, wherein Abbe numbers of the fourth and fifth lenses with respect to d-line are not less than 35 and an Abbe number of the sixth lens with respect to d-line is not greater than 30.

10. The image pickup lens of claim 1, wherein an Abbe number of the first lens with respect to d-line is not less than 40.

11. The image pickup lens of claim 1, wherein an aperture is disposed between the second and third lenses.

12. The image pickup lens of claim 1, wherein an aperture is disposed between the third and fourth lenses.

13. An image pickup apparatus, comprising the image pickup lens of claim 1.

* * * * *